United States Patent
Hebard et al.

(10) Patent No.: US 7,913,173 B2
(45) Date of Patent: *Mar. 22, 2011

(54) METHOD AND APPARATUS FOR ACQUIRING DATA PRESENTED WITHIN A WEB BROWSER

(75) Inventors: Emily W. Hebard, San Francisco, CA (US); Lisa D. Holzhauser, San Carlos, CA (US); Carrie Whitehead, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 457 days.

This patent is subject to a terminal disclaimer.

(21) Appl. No.: 11/799,236

(22) Filed: Apr. 30, 2007

(65) Prior Publication Data

US 2008/0295002 A1    Nov. 27, 2008

(51) Int. Cl.
 *G06F 17/00* (2006.01)
 *G06F 3/048* (2006.01)
(52) U.S. Cl. ......... 715/744; 715/211; 715/230; 715/769
(58) Field of Classification Search .................. 715/733, 715/739, 768, 211, 230, 744, 769
See application file for complete search history.

(56) References Cited

U.S. PATENT DOCUMENTS

| 7,065,713 | B1* | 6/2006 | Dutta et al. | 715/768 |
| 7,343,559 | B1* | 3/2008 | Fujita et al. | 715/733 |
| 2002/0008719 | A1* | 1/2002 | Miyawaki et al. | 345/764 |

* cited by examiner

*Primary Examiner* — Namitha Pillai
(74) *Attorney, Agent, or Firm* — Park, Vaughan, Fleming & Dowler LLP

(57) ABSTRACT

One embodiment of the present invention provides a system that facilitates acquiring data, which is presented within a web browser, for an application. During operation, the system receives a command from a user to acquire data from the web browser for the application. In response to the command, the system overlays a semi-transparent layer over at least a portion of the web browser, so that the data within the web browser is still visible to the user. The system also receives a drawing command, from the user, to draw a shape around an item of data within the web browser. In response to the drawing command, the system draws a shape around the item of data within the web browser, wherein the shape is drawn on the semi-transparent layer. Finally, the system acquires the item of data bounded by the shape for the application.

21 Claims, 3 Drawing Sheets

TEMPORARY TABLE 208

| FIELD | VALUE |
|---|---|
| PAYEE | SKI BARN |
| AMOUNT | $205.09 |
| ... | ... |

WEB BROWSER 202

TRACING LAYER 204

| QTY. | DESCRIPTION | COST |
|---|---|---|
| 1 | Women's Jacket, Red, Extra Large | $49.95 |
| 1 | Women's Ski Boots, Red, Size 9 | $139.95 |
| | Subtotal | $189.90 |
| | Tax | $15.19 |
| | Total | $205.09 |

Shape 206

FIG. 2

METHOD AND APPARATUS FOR ACQUIRING DATA PRESENTED WITHIN A WEB BROWSER

BACKGROUND

Related Art

The Internet is a widely used medium for commerce and other financial transactions. From purchases involving physical products, to online banking, to travel arrangements, the Internet is an indispensable part of many people's lives.

Many users who conduct business transactions online also use software to manage their finances. These users typically enter their purchases into their financial management software through a keyboard. This key-entry is time consuming, tedious, and error prone. Consequently, some users delay entering financial information until a time when they can enter many transactions at once. This delayed-entry can lead to further problems, such as accidentally forgetting to enter some information.

Furthermore, because of the tedium of entering financial information, some users enter only the financial information that they feel is necessary for their records. For example, a user may enter only the payee, the amount, and the date, and may skip other information, such as a description of the goods and/or services purchased. This skipped information may be valuable to the user at a later time, but the user may no longer remember the skipped information at the later time.

SUMMARY

One embodiment of the present invention provides a system that facilitates acquiring data, which is presented within a web browser, for an application. During operation, the system receives a command from a user to acquire data from the web browser for the application. In response to the command, the system overlays a semi-transparent layer over at least a portion of the web browser, so that the data within the web browser is still visible to the user. The system also receives a drawing command, from the user, to draw a shape around an item of data within the web browser. In response to the drawing command, the system draws a shape around the item of data within the web browser, wherein the shape is drawn on the semi-transparent layer. Finally, the system acquires the item of data bounded by the shape for the application.

In some embodiments of the present invention, the system acquires the item of data by moving the item of data to a temporary table. Next, the system receives a designation of a field within the application associated with the item of data. Then, the system saves the designation along with the item of data in the temporary table. Finally, the system imports the item of data into the field within the application.

In some embodiments of the present invention, the system saves the semi-transparent layer and the designation of the field within the application as a template to facilitate subsequent data entry.

In some embodiments of the present invention, the system saves the template to a template repository to facilitate subsequent downloads of the template by additional users.

In some embodiments of the present invention, the system downloads a template, which includes shapes for the semi-transparent layer and associations between data bounded by the shapes and fields within the application. Next, the system applies the template to the semi-transparent layer and the temporary table. Finally, the system imports the items of data into the fields within the application.

In some embodiments of the present invention, downloading the template involves downloading the template from one of: a template repository, a website that is serving the data file, a third-party, and a locally-attached storage device.

In some embodiments of the present invention, receiving the designation of the field within the application involves receiving a dragging command from the user, which involves the user dragging the item of data from the temporary table to the field within the application.

In some embodiments of the present invention, the system receives an edit command from the user. In response to the edit command, the system allows the user to edit the item of data in the temporary table.

In some embodiments of the present invention, the system notifies the user of a data type mismatch if a data-type for the item of data does not match a data-type for the field within the application.

In some embodiments of the present invention, the web browser is opened within the application.

BRIEF DESCRIPTION OF THE FIGURES

FIG. 2 illustrates a data acquisition process in accordance with an embodiment of the present invention.

DETAILED DESCRIPTION

Figure 1:
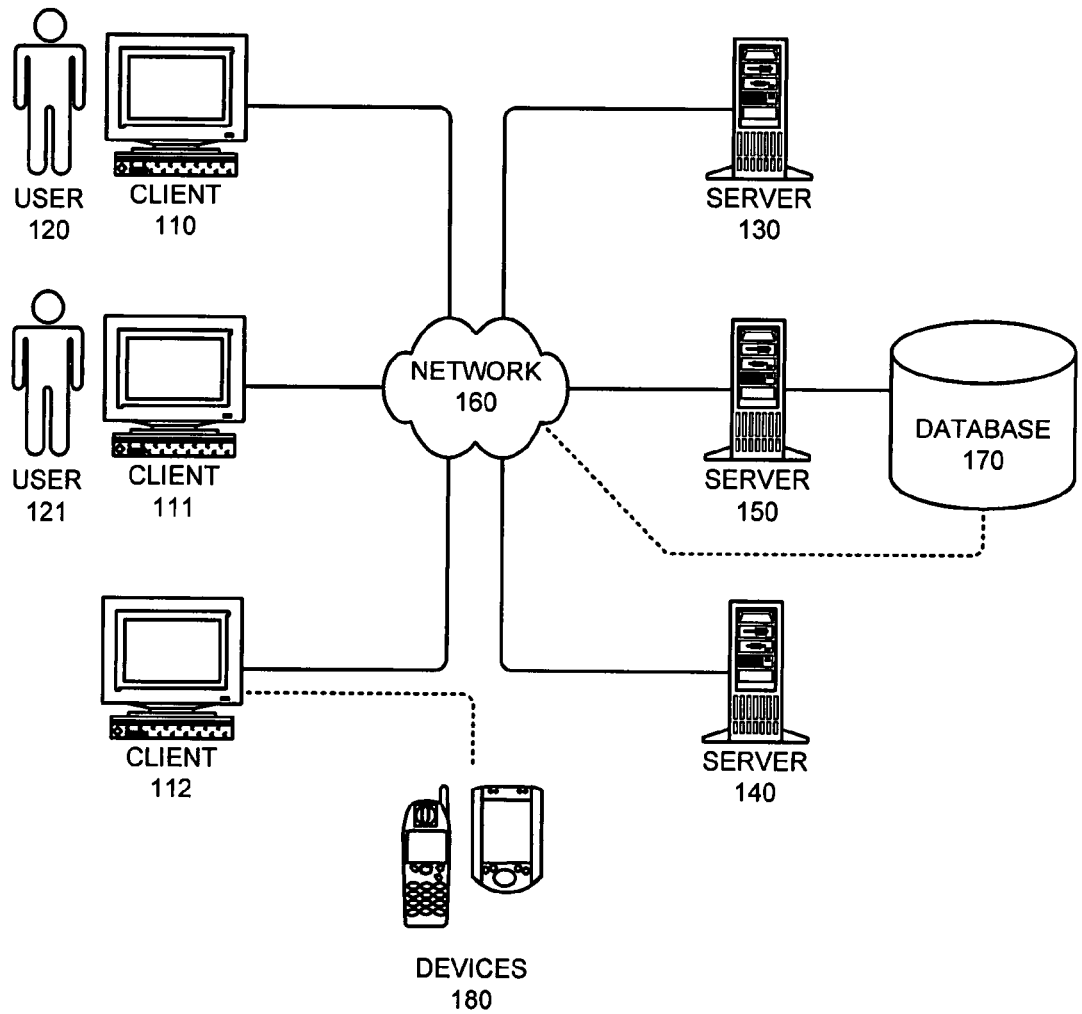
FIG. 1 illustrates a computing environment 100 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates acquiring data, which is presented within a web browser, for an application. Note that the data can come from any source, as long as it can be displayed within a web browser.

During operation, the system receives a command from a user to acquire data from the web browser for the application. In response to the command, the system overlays a semi-transparent layer over at least a portion of the web browser, so that the data within the web browser is still visible to the user. Note that this semi-transparent layer may have the visual appearance of a sheet of tracing paper. The system also receives a drawing command, from the user, to draw a shape around an item of data within the web browser. In response to the drawing command, the system draws a shape around the item of data within the web browser, wherein the shape is drawn on the semi-transparent layer. Finally, the system acquires the item of data bounded by the shape for the application.

In some embodiments of the present invention, the system acquires the item of data by moving the item of data to a temporary table. Next, the system receives a designation of a field within the application associated with the item of data. Then, the system saves the designation along with the item of data in the temporary table. Finally, the system imports the item of data into the field within the application.

In some embodiments of the present invention, the system saves the semi-transparent layer and the designation of the field within the application as a template to facilitate subsequent data entry.

In some embodiments of the present invention, the system saves the template to a template repository to facilitate subsequent downloads of the template by additional users.

In some embodiments of the present invention, the system downloads a template, which includes shapes for the semi-transparent layer and associations between data bounded by the shapes and fields within the application. Next, the system applies the template to the semi-transparent layer and the temporary table. Finally, the system imports the items of data into the fields within the application.

In some embodiments of the present invention, downloading the template involves downloading the template from one of: a template repository, a website that is serving the data file, a third-party, and a locally-attached storage device.

In some embodiments of the present invention, receiving the designation of the field within the application involves receiving a dragging command from the user, which involves the user dragging the item of data from the temporary table to the field within the application.

In some embodiments of the present invention, the system receives an edit command from the user. In response to the edit command, the system allows the user to edit the item of data in the temporary table.

In some embodiments of the present invention, the system notifies the user of a data type mismatch if a data-type for the item of data does not match a data-type for the field within the application. For example, the system may notify the user if the user is attempting to map text to a currency field, or if the user is trying to map a currency value to a date field.

In some embodiments of the present invention, the web browser is opened within the application.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes clients 110-112, users 120 and 121, server 130, server 140, server 150, network 160, database 170, and devices 180.

Clients 110-112 can generally include any node on a network including computational capability and including a mechanism for communicating across the network.

Servers 130-150 can generally include any system capable of hosting and/or running a service that is accessible from network 160. Furthermore, servers 130-150 can generally include any nodes on a computer network including a mechanism for servicing requests from a client for computational and/or data storage resources.

Users 120 and 121 can generally include: an individual; a group of individuals; an organization; a group of organizations; a computing system; a group of computing systems; or any other entity that can interact with computing environment 100.

Network 160 can generally include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as mp3 players), gaming systems, digital cameras, portable storage mediums, or any other device that can be coupled to the client. Note that in some embodiments of the present invention, devices 180 can couple directly to network 160 and can function in the same manner as clients 110-112.

Data Acquisition

FIG. 2 illustrates a data acquisition process in accordance with an embodiment of the present invention. In one embodiment of the present invention, user 120 uses web browser 202 on client 110 to purchase goods from an online vendor. Upon being presented with financial data, such as an itemized receipt, user 120 invokes the data acquisition tool which overlays a tracing layer 204 on top of the financial data presented in web browser 202. Note that web browser 202 may be opened within user 120's financial management application, or may be opened as a stand-alone browser.

Once tracing layer 204 is active, user 120 manipulates a drawing tool to circle all of the items of data that user 120 wants to enter into user 120's financial management application. For example, as illustrated in FIG. 2, user 120 has encircled the transaction total with shape 206. User 120 then drags shape 206 to temporary table 208. Note that in some embodiments of the present invention, upon creating shape 206, data encircled by shape 206 is automatically populated to temporary table 208.

In some embodiment of the present invention, the values in the "field" column of temporary table 208 are automatically populated from user 120's financial management software, while in other embodiments of the present invention, user 120 drags the fields to temporary table 208 from the financial management software.

Upon completing the data acquisition operations, user 120 closes tracing layer 204. In some embodiments of the present invention, user 120 is presented with the option of saving the tracing layer shapes from tracing layer 204, the field mappings in temporary table 208, or both as a template for future data acquisition from the same web site.

In some embodiments of the present invention, templates are saved on client 110 to facilitate subsequent data acquisition by user 120 from the same web site. User 120 may also share the template with other users, such as user 121, to facilitate data acquisition from the same web site. Note that user 121 may use the template even if user 121 uses different financial management software, because the data that has already been mapped to temporary table 208 can be easily remapped to fields within user 121's financial management software without having to re-encircle the data.

In some embodiments of the present invention, user 120 sends the template to a template collection or a template database, such as database 170. Likewise, when acquiring data from a web page that user 120 has never acquired data from in the past, user 120 may contact database 170 to search for an existing template. In some embodiment of the present invention, the template may be linked to and acquired as a download from the web page that user 120 is acquiring the data from. Furthermore, in some embodiments of the present invention, the template may be included with user 120's financial management software.

Process of Data Acquisition

Figure 3:
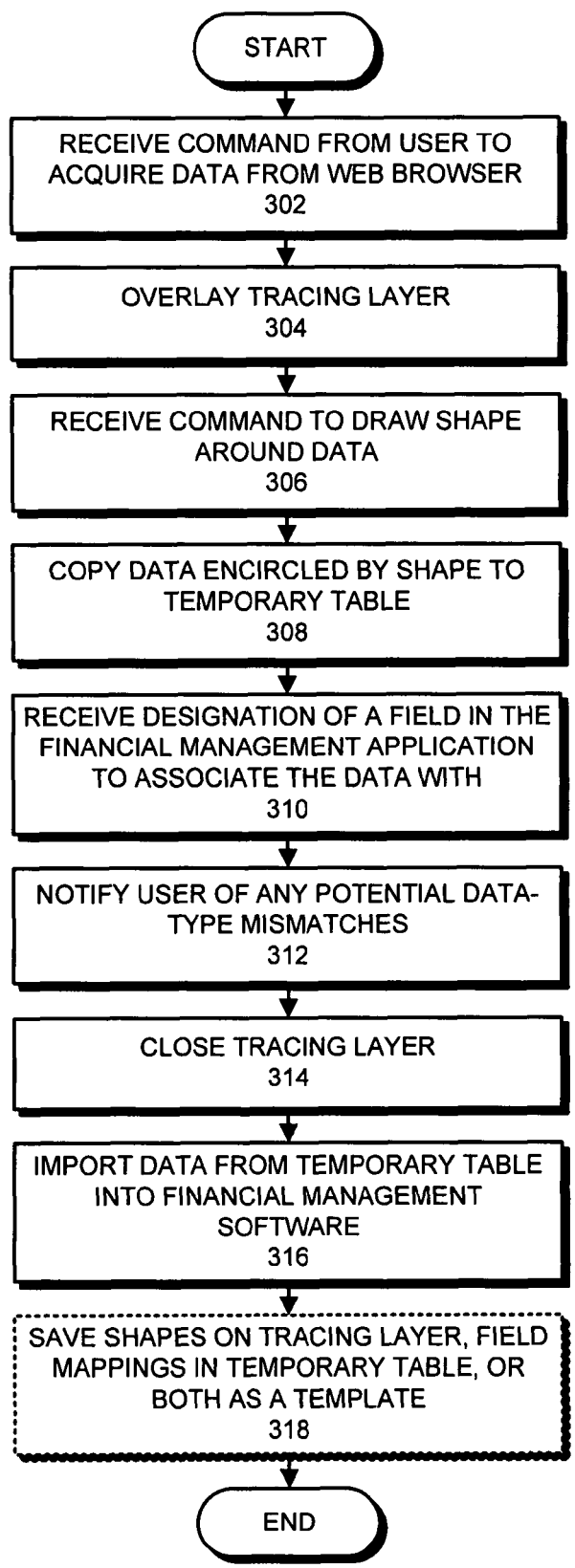
FIG. 3 presents a flow chart illustrating the process of acquiring data in accordance with an embodiment of the present invention.

FIG. 3 presents a flow chart illustrating the process of acquiring data in accordance with an embodiment of the present invention. During operation, the system receives a command from user 120 to acquire data from web browser 202 (operation 302). In response to the command, the system overlays tracing layer 204 over the data in web browser 202 (operation 304). Note that tracing layer 204 may be semi-translucent so that the data is still visible through tracing layer 204. In some embodiments of the present invention, tracing layer 204 may be virtually transparent, while in other embodiments of the present invention, tracing layer 204 may be close to opaque. In some embodiments of the present invention, the level of transparency of tracing layer 204 is configurable by user 120.

Once tracing layer 204 is overlaid on the data, the system receives a drawing command from user 120 who draws a shape around an item of data (operation 306). The system then copies the data encircled by the shape to temporary table 208 (operation 308). The system also receives a designation of a field in the financial management application to associate the data with (operation 310). In some embodiments of the present invention, this can involve dragging the data to the field within the financial management application, while in other embodiments of the present invention, the system can attempt to automatically map the fields. In some embodiments of the present invention, the system may utilize field names or meta tags within the data to attempt to automatically map the fields. Note that in some embodiments of the present invention, user 120 may edit the data in temporary table 208.

In some embodiments of the present invention, the system notifies user 120 of potential data-type mismatches (operation 312), such as if user 120 attempts to map a currency value to a date field. Once the mappings have been completed, the system closes tracing layer 204 (operation 314) and imports the data from temporary table 208 into the financial management software (operation 316).

In some embodiments of the present invention, the system saves the shapes on tracing layer 204, the field mappings in temporary table 208, or both as a template for subsequent data acquisition (operation 318). Note that this can involve saving the template locally, on client 110, as well as saving the template to a template repository, such as database 170.

In some embodiments of the present invention, acquiring the text encircled by shape 206 involves analyzing the code that is displayed in the web browser, such as the HyperText Markup Language (HTML) code or the extensible Markup Language (XML) code, and finding the test that is displayed within shape 206. In other embodiments of the present invention, the system performs an Optical Character Recognition (OCR) operation on a bitmap representing the area encircled by shape 206.

In some embodiments of the present invention, the system acquires data from sources other than web browser 202. For example, in one embodiment of the present invention, the system overlays tracing layer 204 on top of an application running on client 110, while in another embodiment of the present invention, the system overlays tracing layer 204 on top of a scanned document.

In some embodiments of the present invention, the system can acquire data from any source that can be displayed on client 110. This can include: data that that resides on client 110, data stored on a storage medium coupled to client 110, data hosted by a device or computer system coupled to client 110, (either directly or via network 160), or any other source for storing or hosting data accessible to client 110.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for importing data, which is presented visually within a web page to a user of an application, the method comprising:
   receiving a command from the user to import data from the web page to the application;
   in response to the command, overlaying a semi-transparent layer over at least a portion of the web page, wherein the portion of the web page that is covered by the semi-transparent layer is still visible to the user;
   receiving a drawing command, from the user, to select an item of data by drawing a shape around the item of data displayed within the web page, wherein the item of data includes a visually presented data value, and wherein non-selected data content within the web page remains visible to the user after the item of data is selected;
   in response to the drawing command, drawing the shape around the item of data on the semi-transparent layer; and
   importing the item of data, which is encircled by the boundary of the shape, to the application by:
      populating the visually presented data value as presented to the user by the web page to a temporary table associated with the application, and
      mapping the visually presented data value to a field within the application, wherein a row in the temporary table includes the visually presented data value as presented to the user by the web page and a name of the mapped field.

2. The method of claim 1, wherein importing the item of data further comprises:
   receiving a designation of the field within the application associated with the item of data;
   saving the designation along with the visually presented data value in the temporary table; and
   importing the visually presented data value as presented to the user by the web page into the field within the application.

3. The method of claim 2, further comprising saving the semi-transparent layer and the designation of the field within the application as a template to facilitate subsequent data entry.

4. The method of claim 3, further comprising saving the template to a template repository to facilitate subsequent downloads of the template by additional users.

5. The method of claim 2, further comprising:
   downloading a template, which includes shapes for the semi-transparent layer and associations between data bounded by the shapes and fields within the application;
   applying the template to the semi-transparent layer and the temporary table; and
   importing the items of data into the fields within the application.

6. The method of claim 5, wherein downloading the template involves downloading the template from one of:
   a template repository;
   a website that is serving the data file;
   a third-party; and
   a locally-attached storage device.

7. The method of claim 2, wherein receiving the designation of the field within the application involves receiving a dragging command from the user, which involves the user dragging the visually presented data value from the temporary table to the field within the application.

8. The method of claim 2, further comprising:
   receiving an edit command from the user; and
   in response to the edit command, allowing the user to edit the visually presented data value in the temporary table.

9. The method of claim 2, further comprising notifying the user of a data type mismatch if a data-type for the item of data does not match a data-type for the field within the application.

10. The method of claim 1, wherein the web page is opened within the application.

11. A non-transitory computer-readable storage medium storing instructions that when executed by a computer cause the computer to perform a method for importing data, which is presented visually within a web page to a user of an application, the method comprising:
   receiving a command from the user to import data from the web page to the application;
   in response to the command, overlaying a semi-transparent layer over at least a portion of the web page, wherein the portion of the web page that is covered by the semi-transparent layer is still visible to the user;
   receiving a drawing command, from the user, to select an item of data by drawing a shape around the item of data displayed within the web page, wherein the item of data includes a visually presented data value, and wherein non-selected data content within the web page remains visible to the user after the item of data is selected;
   in response to the drawing command, drawing the shape around the item of data on the semi-transparent layer; and
   importing the item of data, which is encircled by the boundary of the shape, to the application by:
      populating the visually presented data value as presented to the user by the web page to a temporary table associated with the application, and
      mapping the visually presented data value to a field within the application, wherein a row in the temporary table includes the visually presented data value as presented to the user by the web page and a name of the mapped field.

12. The computer-readable storage medium of claim 11, wherein importing the item of data further comprises:
   receiving a designation of the field within the application associated with the item of data;
   saving the designation along with the visually presented data value in the temporary table; and
   importing the visually presented data value as presented to the user by the web page into the field within the application.

13. The computer-readable storage medium of claim 12, wherein the method further comprises saving the semi-transparent layer and the designation of the field within the application as a template to facilitate subsequent data entry.

14. The computer-readable storage medium of claim 13, wherein the method further comprises saving the template to a template repository to facilitate subsequent downloads of the template by additional users.

15. The computer-readable storage medium of claim 12, wherein the method further comprises:
   downloading a template, which includes shapes for the semi-transparent layer and associations between data bounded by the shapes and fields within the application;
   applying the template to the semi-transparent layer and the temporary table; and
   importing the items of data into the fields within the application.

16. The computer-readable storage medium of claim 15, wherein downloading the template involves downloading the template from one of:
   a template repository;
   a website that is serving the data file;
   a third-party; and
   a locally-attached storage device.

17. The computer-readable storage medium of claim 12, wherein receiving the designation of the field within the application involves receiving a dragging command from the user, which involves the user dragging the visually presented data value from the temporary table to the field within the application.

18. The computer-readable storage medium of claim 12, wherein the method further comprises:
   receiving an edit command from the user; and
   in response to the edit command, allowing the user to edit the visually presented data value in the temporary table.

19. The computer-readable storage medium of claim 12, wherein the method further comprises notifying the user of a data type mismatch if a data-type for the item of data does not match a data-type for the field within the application.

20. The computer-readable storage medium of claim 11, wherein the web page is opened within the application.

21. An apparatus for importing data, which is visually presented within a web page to a user of an application, comprising:
   a processor;
   a memory;
   a receiving mechanism configured to receive a command from the user to import data from the web page to the application;
   an overlay mechanism configured to overlay a semi-transparent layer over at least a portion of the web page, in response to the command, wherein the portion of the web page that is covered by the semi-transparent layer is still visible to the user;
   wherein the receiving mechanism is further configured to receive a drawing command, from the user, to select an item of data by drawing a shape around the item of data displayed within the web page, wherein the item of data includes a visually presented data value, and wherein non-selected data content within the web browser remains visible to the user after the item of data is selected;

a drawing mechanism configured to draw the shape around the item of data on the semi-transparent layer; and an importing mechanism configured to import the item of data, which is encircled by the boundary of the shape, to the application by:
- populating the visually presented data value as presented to the user by the web page to a temporary table associated with the application, and
- mapping the visually presented data value to a field within the application, wherein a row in the temporary table includes the visually presented data value as presented to the user by the web page and a name of the mapped field.

* * * * *